United States Patent
Errthum

[19]

[11] Patent Number: 6,024,574
[45] Date of Patent: Feb. 15, 2000

[54] VISUAL AIDS FOR UNDERSTANDING CHARACTERISTICS OF GEOMETRIC FIGURES

[76] Inventor: Emily Errthum, 2944 N. 92nd St., Milwaukee, Wis. 53222

[21] Appl. No.: 09/103,009

[22] Filed: Jun. 23, 1998

[51] Int. Cl.[7] .................................................. G09B 23/04
[52] U.S. Cl. .......................................................... 434/216
[58] Field of Search .................................. 434/211, 216; 40/316, 647, 658

[56] References Cited

U.S. PATENT DOCUMENTS

| | | | |
|---|---|---|---|
| 285,435 | 9/1883 | Schlechter | 40/658 X |
| 630,217 | 8/1899 | Hanstein | 434/216 |
| 1,810,421 | 6/1931 | Guyer | 434/216 |
| 2,168,634 | 8/1939 | Spencer | 434/216 |

FOREIGN PATENT DOCUMENTS

| | | | |
|---|---|---|---|
| 2010343 | 3/1994 | Russian Federation | 434/211 |
| 157842 | 9/1963 | U.S.S.R. | 434/211 |
| 217760 | 5/1968 | U.S.S.R. | 434/211 |
| 259501 | 6/1970 | U.S.S.R. | 434/216 |

OTHER PUBLICATIONS

Nasco Math Catalog, 1998, pp. 78, 79, 90–93, 96.
Cuisenaire Dale Seymour Publications, 1998, pp. 102, 103.

*Primary Examiner*—John A. Ricci
*Attorney, Agent, or Firm*—Andrus, Sceales, Starke & Sawall

[57] ABSTRACT

A geometric figure teaching aid includes a base, a rod affixed to and extending from the base, and a series of side members interconnected with the base and the rod. The base is preferably formed of a translucent material, and the rod is mounted to the base at a first end and terminates at a second end spaced above the base. The side members extend from edges defined by the base member and are engaged with the rod at the second end of the rod. Clips are mounted to the side members, and are adapted to receive labels for identifying characteristics of the geometric figure represented by the side member, or to carry a given value corresponding to a problem. Lines are provided on the base, extending from the center of the base, from which the rod extends, outwardly to locations at which the side members are engaged with the base. The lines correspond to dimensions or aspects of the geometric figure. The base is preferably formed of a translucent material defining a top surface and a bottom surface, and the lines are preferably formed on the bottom surface of the base. The top surface of the base can be written upon by an instructor, so as to apply indicia relevant to the aspects or dimensions represented by the lines on the base. The teaching aid thus enables an instructor to apply indicia identifying the various aspects of the geometric figure, or given values for a particular problem. In this manner, the various aspects of a geometric figure can be readily visualized and understood by a student, thus facilitating a student's learning of geometric figures.

11 Claims, 2 Drawing Sheets

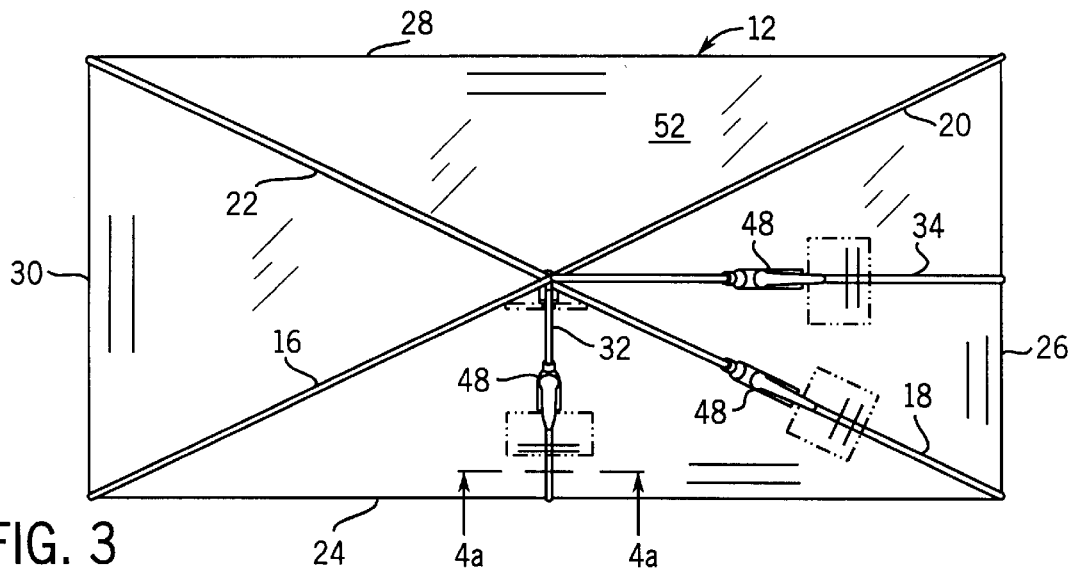
FIG. 3
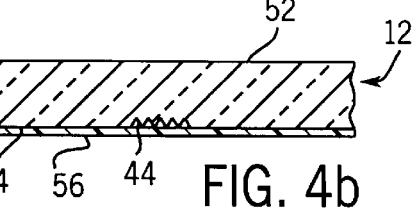
FIG. 4a
FIG. 4b
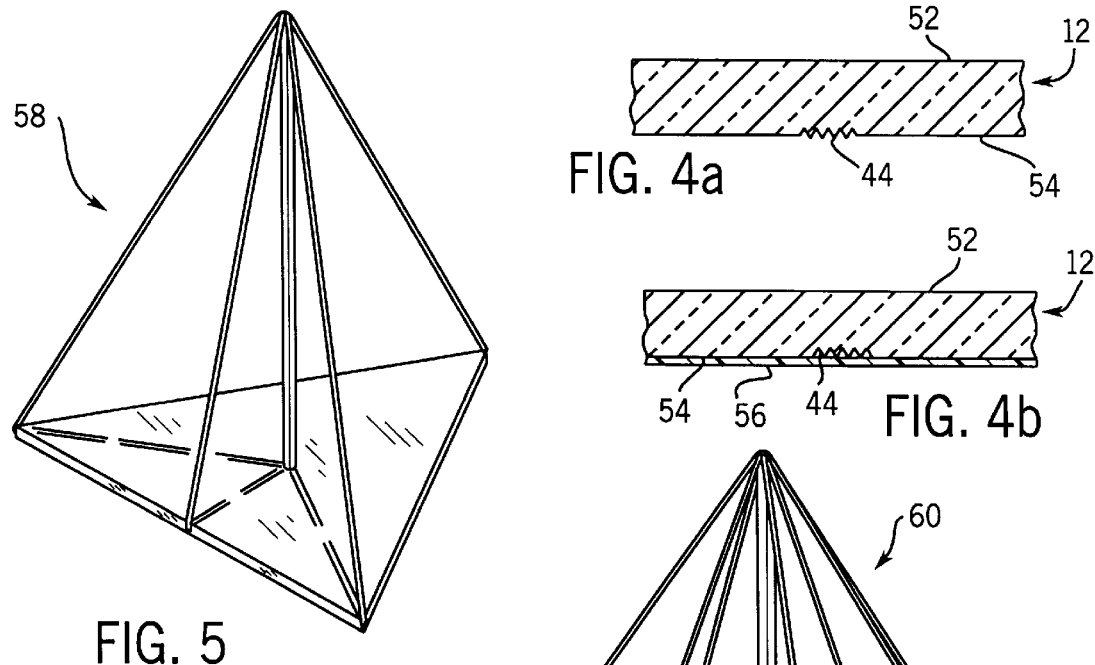
FIG. 5
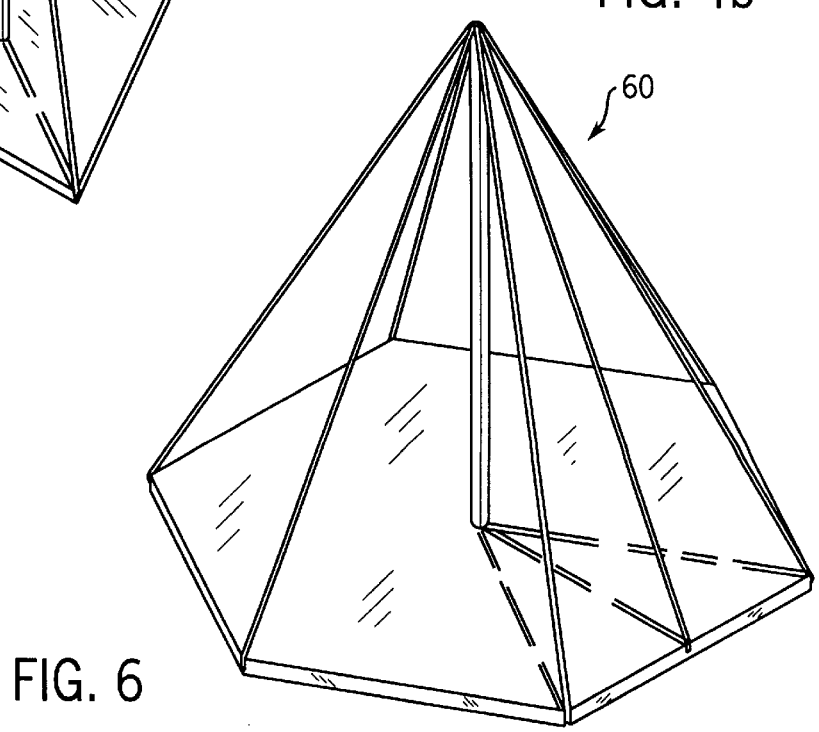
FIG. 6

VISUAL AIDS FOR UNDERSTANDING CHARACTERISTICS OF GEOMETRIC FIGURES

BACKGROUND AND SUMMARY OF THE INVENTION

This invention relates to a teaching aid for use in understanding or visualizing characteristics of a geometric figure.

In teaching geometric figures such as cones or pyramids, it is often necessary to calculate certain dimensions of the geometric figures in order to arrive at a solution to a problem. For example, in calculating the surface area of a side of a pyramid, it is necessary to first solve for the slant height of the pyramid given other dimensions or angles of the pyramid. It has been found that students have difficulty visualizing such dimensions which are not visible from a two-dimensional drawing or three-dimensional representation of the geometric figure. This difficulty also stands in the way of the student solving such a problem.

It is an object of the present invention to provide a teaching aid for geometric figures in order to assist students in visualizing various characteristics or dimensions of a geometric figure. It is a further object of the invention to provide such an aid which can be adapted for use with geometric figures of various shapes. A still further object of the invention is to provide such an aid which facilitates application of indicia by an instructor pertaining to various characteristics or dimensions of the geometric figure. Yet another object of the invention is to provide such an aid which is relatively simple in its construction and yet which greatly enhances visualization or understanding of various aspects of a geometric figure.

In accordance with the invention, a geometric figure teaching aid includes a base member, a rod and at least one side member. The base member defines an outer peripheral edge having a shape corresponding to the shape of the base of a geometric figure, and preferably includes a series of edges which intersect at corners. The rod has a first end interconnected with the base member and terminates at a second end spaced from the first end. The spacing of the second end of the rod from the base member corresponds to the height of the geometric figure. The side member extends from an edge of the base member to the second end of the rod. Preferably, a side member extends from each corner of the base member to the second end of the rod, to define the corners between adjacent sides of the geometric figure. In addition, a side member preferably extends between the second end of the rod and an edge of the side member between an adjacent pair of side members defining corners of the geometric figure. The base member includes at least one line which extends between the first end of the rod and an edge of the base member, to indicate a dimension corresponding to a dimension of the base of the geometric figure. In a preferred form, the base member is formed of a piece of translucent material defining a top surface and a bottom surface. The rod extends from the top surface of the translucent base member, and the line is preferably provided on the bottom surface of the translucent base member. A backing member, such as a backer sheet, may be applied to the bottom surface of the base member so as to enhance visibility of the line. Alternatively, the backer sheet may be eliminated so as to enable the base member of the geometric figure to be useable on an overhead projector or the like. The line may be etched into the bottom surface of the translucent base member, and the top surface of the base member is adapted to receive indicia pertaining to the dimension or characteristic of the geometric figure corresponding to the line on the base member.

In accordance with another aspect of the invention, at least one of the side members carries a clip member for releasably engaging a label for indicating a characteristic of the side member. For example, the label may carry a value indicating a given dimension of the side member, or nomenclature identifying the side member, or a mathematical expression pertaining to the side member. In a preferred form, the side member is in the form of a string or cord extending from the second end of the rod to an edge of the base member, and the clip member is in the form of an alligator clip attached to the string or cord.

The various aspects of the invention may be employed independently of each other, or may be combined in a geometric figure teaching aid incorporating numerous advantageous and greatly facilitating understanding of various aspects of a geometric figure.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a top plan view of the geometric figure teaching aid of FIGS. 1 and 2;

FIG. 4a is a partial section view taken along line 4a—4a of FIG. 3, showing one embodiment for providing a line on the base member of the geometric figure teaching aid;

FIG. 4b is a view similar to FIG. 4a, showing an alternative embodiment for providing a line on the base member of the geometric figure teaching aid; and FIGS. 5 and 6 are isometric views of additional shapes of geometric figure teaching aids constructed in accordance with the present invention.

DETAILED DESCRIPTION OF THE INVENTION

Figure 1:
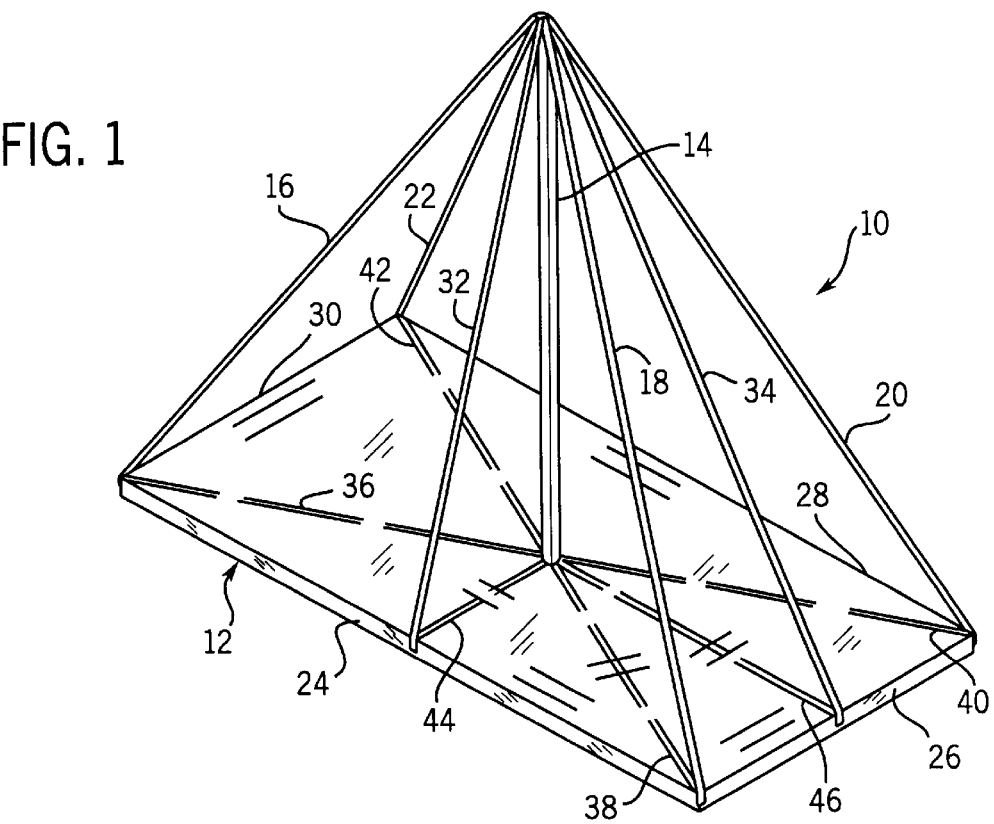
FIG. 1 is an isometric view of a geometric figure teaching aid constructed according to the invention.

FIG. 1 illustrates a geometric figure teaching aid 10 constructed according to the invention. Teaching aid 10 has a shape corresponding to the shape of a geometric figure being taught and, being representatively, may be in the form of a right pyramid as shown. Generally, geometric figure teaching aid 10 includes a base member 12, a rod 14 extending upwardly from base member 12, and a series of side members shown at 16, 18, 20 and 22.

Rod 14 defines a lower end which is received within a central opening formed in base member 12 and secured in position therein. Rod 14 is rigid, terminating in an upper end spaced above base member 12 a distance corresponding to the height or altitude of the geometric figure represented by geometric figure teaching aid 10.

Base member 12 defines side edges 24, 26, 28 and 30, which cooperate to define corners from which side members 16–22 extend. Side member 16 extends between the upper end of rod 14 and the corner between edges 24 and 30; side member 18 extends between the upper end of rod 14 and the corner defined between edges 24 and 26; side member 20 extends between the upper end of rod 14 and the corner defined between edges 26 and 28; and side member 22 extends between the upper end of rod 14 and the corner defined between edges 28 and 30.

The upper end of rod 14 includes grooves or notches which receive side members 16–22. Preferably, side member 16 and side member 20 are a single length of string or cord, one end of which is anchored in an opening formed in the corner of base member 12 defined between edges 24 and 30, and the other end of which is anchored in an opening formed in the corner of base member 12 defined between edges 26 and 28, with the central portion of the length of string or cord being engaged within a notch formed in the upper end of rod 14. Side members 18 and 22 are preferably constructed in a similar manner and similarly engaged with base member 12 and rod 14.

With the above-described construction, geometric figure teaching aid 10 has a shape generally corresponding to that of a geometric figure, with the geometric figure base being defined by base member 12 and the geometric figure sides being defined by the area circumscribed by side members 16–22 and the base member edge between adjacent pairs of side members 16–22.

A pair of slant height side members, shown at 32, 34, are interconnected with base member 12 and rod 14. Slant height side member 32 bisects the side defined by side members 16 and 18 in combination with base member edge 24, defining an upper end engaged with rod 14 and a lower end received within an opening formed in edge 24 midway along its length. Similarly, slant height side member 34 bisects the side defined by side members 18 and 20 in combination with base member edge 26, defining an upper end engaged with the upper end of rod 14 and a lower end received within an opening in base member edge 26 formed midway along the length of base member edge 26.

A series of lines 36, 38, 40 and 42 extend from the center of base member 12 outwardly to the corners of base member 12 with which side members 16–22, respectively, are engaged. In addition, a pair of lines 44 and 46 extend from the center of base member 12 outwardly to base member edges 24, 26 respectively, where the lower ends of slant/height side members 32, 34, are engaged with edges 24, 26, respectively. Lines 36–46 correspond to relevant geometric figure dimensions used as variables or given values in a geometric figure problem.

Figure 2:
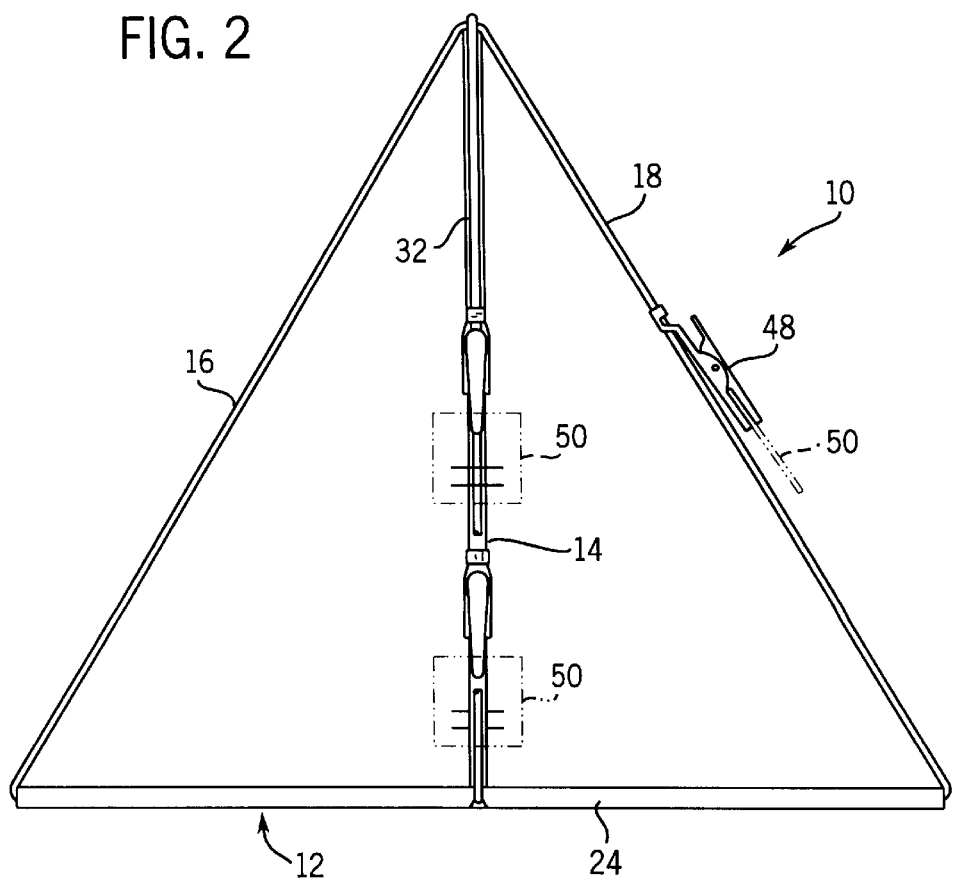
FIG. 2 is a side elevation view of the geometric figure teaching aid of FIG. 1.

Clip members may be mounted to rod 14 and any or all of side members 16–34. As shown in FIGS. 2 and 3, a clip member 48 is secured to each of side members 18, 32 and 34 as well as to rod 14. Clip members 48 are preferably in the form of alligator clips spring-biased toward a closed position, and are adapted to receive a label, such as shown at 50, for indicating a dimension or characteristic of the geometric figure corresponding to the side member to which the clip member 48 is mounted. For example, label 50 may carry indicia identifying the side member by name, e.g. slant/height or lateral side or a mathematical formula expressing the length of the side member or simply the length of the side member. In this manner, labels 50 can be used to correspond to various side members to given values in a problem or identifying the side member as the variable sought to be solved in a problem.

FIG. 4a illustrates the manner in which lines such as 36–46 are provided on base member 12. Base member 12 is in the form of a piece of translucent material defining a top surface 52 and a bottom surface 54. Representatively, base member 12 may be formed of a material such as Plexiglas or Lexan. Line 44 is formed in base member 12 by scribing base member lower surface 54, outwardly from the center of base member 12 toward the location at which the lower end of side member 32 is engaged with base member 12, perpendicular to base member edge 24.

With this construction of base member 12, the instructor can place geometric figure teaching aid 10 on an overhead projector, which provides a view like that illustrated in FIG. 3. The instructor can apply appropriate indicia to base member 12 using a removable marker, which is then visible on the projected image to assist students in visualizing the dimensions or characteristics represented by lines 36–46.

A backer sheet 56 may be applied to base member bottom surface 54 after lines 36–46 have been formed therein. Backer sheet 56 provides a uniform background for base member 12, thus ensuring visibility of lines 36–46 regardless of the surface on which base member 12 is placed. When backer sheet 56 is used, it is preferably secured in place by application of an adhesive between base member bottom surface 54 and the upper surface of backer sheet 56.

FIGS. 5 and 6 illustrate alternative geometric teaching aids 58 and 60, respectively, having different shapes then geometric teaching aid 10 and which incorporate the features of the present invention. Geometric figure teaching aid 56 is in the form of a three-sided pyramid, whereas geometric figure teaching aid 58 is in the form of a six-sided pyramid. Geometric figure teachings aids 56, 58 illustrate but a few of numerous square, pentagonal or any other configurations for a geometric figure teaching aid constructed in accordance with the present invention, and simply illustrate the versatility of the present invention in providing a geometric figure teaching aid which can be adapted to different figures to facilitate visualization or understanding of various aspects or dimensions of a geometric figure. As can readily be appreciated, teaching aids of other configurations are contemplated, such as an aid incorporating a circular base to provide a conical aid, or an aid having a base in the form of a square, pentagon or any other polyhedron to provide a pyramidal aid.

As can be appreciated, the geometric figure teaching aid of the present invention is relatively simple in its construction, yet provides a structure which greatly facilitates visualization of various dimensions or characteristics of a geometric figure, and therefore understanding of the figure and ability to teach students about geometric figures in a manner which is readily comprehended by the students. Labels 50 can be interchanged and indicia can be applied and removed from base member 12, thus enabling an instructor to easily change given values corresponding to a particular problem or to simply identify the various characteristics of a geometric figure.

Various alternatives and embodiments are contemplated as being within the scope of the following claims particularly pointing out and distinctly claiming the subject matter regarded as the invention.

I claim:

1. An aid for use in understanding characteristics of a geometric figure having a base, a height and one or more sides, comprising:

a base member defining one or more edges, wherein the shape of the base member corresponds to the configuration of the base of the geometric figure;

a rod having a first end interconnected with the base member and terminating at a second end, wherein the second end of the rod is spaced from the base a distance corresponding to the height of the geometric figure;

at least one side member extending from an edge of the base member to the second end of the rod, wherein the side member lies in a location corresponding to the plane of one of the sides of the geometric figure;

wherein the base member includes at least one line extending between the first end of the rod and an edge of the base member adjacent the side member to indicate a dimension corresponding to a dimension of the base of the geometric figure;

wherein the base member is formed of a piece of translucent material defining a bottom surface and a top surface from which the rod extends, and wherein the line is formed on the bottom surface of the translucent material so as to be visible therethrough from the top surface of the piece of translucent material.

2. The geometric figure aid of claim 1, wherein the base member defines a series of corners, and further comprising one or more additional side members extending from a corner of the base member to the second end of the rod and lying in the same plane as that of the first-mentioned side member, wherein the side members cooperate to define an area corresponding to the shape of the one of the sides of the geometric figure, and wherein the base member further includes a line extending between the first end of the rod and an edge of the base member adjacent the additional side member to indicate a dimension on the base member corresponding to a dimension of the base of the geometric figure.

3. The geometric figure aid of claim 1, wherein the line is etched into the bottom surface of the piece of translucent material.

4. The geometric figure aid of claim 3, further comprising a backing member carried by the bottom surface of the base member adjacent the line to enhance the visibility of the line through the translucent material of the base member.

5. An aid for use in understanding characteristics of a geometric figure having a base, a height and one or more sides comprising:

a base member defining one or more edges wherein the shape of the base member corresponds to the configuration of the base of the geometric figure;

a rod having a first end interconnected with the base member and terminating at a second end, wherein the second end of the rod is spaced from the base member a distance corresponding to the height of the geometric figure;

at least one side member extending from an edge of the base member to the second end of the rod, wherein the side member corresponds to one of the sides of the geometric figure; and wherein the base member is formed of a translucent material and includes at least one line extending between the first end of the rod and the side member at an edge of the base member;

wherein the base member defines a bottom surface and a top surface from which the rod extends, wherein the line is provided on the bottom surface of the base member.

6. The geometric figure aid of claim 5, further comprising one or more additional side members extending from the base member to the second end of the rod, wherein the base member includes a line extending between the first end of the rod and an edge of the base member adjacent at least one of the additional side members.

7. The geometric figure aid of claim 5, wherein the top surface of the base member is adapted to receive indicia adjacent the line relating to a dimension of the base of the geometric figure corresponding to the line.

8. The geometric figure aid of claim 7, further comprising a clip member on the side member for releasably engaging a label for indicating a characteristic of the side member.

9. An aid for use in understanding characteristics of a geometric figure having a base, a height and one or more sides, comprising:

a base member defining a top surface, a bottom surface and one or more edges, wherein the shape of the base member corresponds to the configuration of the base of the geometric figure;

a rod having a first end interconnected with the base member and terminating at a second end, wherein the second end of the rod is spaced from the base member a distance corresponding to the height of the geometric figure;

at least one side member extending from the base member to the second end of the rod; and a clip member carried by the side member for releasably engaging a label for indicating a characteristic of the side member;

wherein the base member includes at least one line on the bottom surface of the base member and extending between the first end of the rod and an edge of the base member adjacent the side member, to indicate a dimension corresponding to a dimension of the base of the geometric figure.

10. The geometric figure aid of claim 9, wherein the clip member comprises an alligator clip secured to the side member between the base member and the second end of the rod.

11. An aid for use in visualizing characteristics of a geometric figure having a base, a height and one or more sides, comprising:

a base member defining a top surface, a bottom surface and one or more edges having a shape corresponding to the configuration of the base of the geometric figure;

a rod having a first end interconnected with the base member and terminating at a second end, wherein the second end of the rod is spaced from the base member a distance corresponding to the height of the geometric figure;

at least one side member extending from an edge of the base member to the second end of the rod, wherein the side member corresponds a side of the geometric figure;

wherein the base member is formed of a translucent material and includes at least one line on the bottom surface of the base member, wherein the line extends between the first end of the rod and the side member at an edge of the base member; and a clip member carried by the side member for releasably engaging a label for indicating a characteristic of the side member.

* * * * *